(12) United States Patent
Mamba et al.

(10) Patent No.: US 7,542,098 B2
(45) Date of Patent: Jun. 2, 2009

(54) DISPLAY DEVICE AND DISPLAY METHOD

(75) Inventors: Norio Mamba, Kawasaki (JP); Takashi Shoji, Fujisawa (JP); Naruhiko Kasai, Yokohama (JP)

(73) Assignee: Hitachi Displays, Ltd., Chiba (JP)

( * ) Notice: Subject to any disclaimer, the term of this patent is extended or adjusted under 35 U.S.C. 154(b) by 694 days.

(21) Appl. No.: 11/255,097

(22) Filed: Oct. 21, 2005

(65) Prior Publication Data

US 2006/0092188 A1 May 4, 2006

(30) Foreign Application Priority Data

Oct. 25, 2004 (JP) ............... 2004-309422

(51) Int. Cl.
*H04N 5/50* (2006.01)
*H04N 9/74* (2006.01)
*H04N 3/14* (2006.01)

(52) U.S. Cl. .............. 348/569; 348/792; 348/598; 348/599

(58) Field of Classification Search ........ 348/569, 348/739, 790–793, 598, 599, 584; 345/204, 345/213, 104; *H04N 5/50, 5/66, 9/12, 3/14, H04N 9/30, 9/74, 9/76*
See application file for complete search history.

(56) References Cited

U.S. PATENT DOCUMENTS 5,874,933 A * 2/1999 Hirai et al. ............. 348/790
6,476,801 B2 * 11/2002 Nagai ..................... 348/558
6,664,970 B1 12/2003 Matsushita

OTHER PUBLICATIONS

Recommendation ITU-R BT.656-4; "Interfaces for Digital Component Video Signals in 525-Line and 625-Line Television Systems Operating at the 4:2:2 Level of Recommendation ITU-R BT.601 (Part A)"; pp. 1-13.

* cited by examiner

*Primary Examiner*—Sherrie Hsia
(74) *Attorney, Agent, or Firm*—McDermott Will & Emery LLP

(57) ABSTRACT

A display device having an on-screen display (OSD) function receives a YUV video signal such as the camera video signal or broadcast video signal of YUV format from a camera or recording medium, receives an RGB-OSD signal from a circuit device (serial interface) of another system different from this YUV video signal, causes a memory within an OSD processor to store the OSD signal, converts an RGB video signal resulting from conversion of the YUV video signal to a panel-matched RGB video signal synchronized with a display synchronization signal, reads a panel-matched RGB OSD signal from the memory of the OSD processor in synchronism with this display synchronization signal, composes those RGB video signal and OSD signal, using an OSD composer, and supplies the resulting RGB composite video signal and the display synchronization signal to a display panel.

13 Claims, 7 Drawing Sheets

DISPLAY DEVICE AND DISPLAY METHOD

INCORPORATION BY REFERENCE

The present application claims priority from Japanese application JP2004-309422 filed on Oct. 25, 2004, the content of which is hereby incorporated by reference into this application.

BACKGROUND OF THE INVENTION

The present invention relates to display devices for displaying images on liquid crystal displays, and particularly to a display device having means for making on-screen display, and a display method for the display device.

Since a display device of the active matrix type such as liquid crystal has features of small depth, light weight and low consumption power, it is also used as a display device for digital still cameras and digital video cameras. Above all, in order for the whole system to achieve the low cost and high picture quality, the display device is demanded to have the interface to the general-purpose digital format.

The Recommendation ITU-R BT. 656-4 known as a specification of the standard digital-format video signal defines a digitalized NTSC/PAL video signal of the interlaced scanning type in which the group of even lines and group of odd lines of each frame are alternately displayed.

In addition, the color format described in the Recommendation ITU-R BT. 656-4 is the format of YUV 4:2:2 formed of luminance information Y and two different pieces, U and V of color-difference information. The luminance information Y is given to each pixel, but the color difference information U, V is compressed to half as much for one of each two pixels.

On the other hand, most of the monitors for the digital still cameras and digital video cameras and display devices for television receivers have the on-screen display (hereinafter, referred to as "OSD") function incorporated and used to display the current status and the post-adjustment status of image in order for the user to make the adjustment of the image position, image quality and so on. This OSD function is now actually built into the signal processor LSI in order to facilitate conversion of resolution and image processing.

The display device having the interface to the digital video of YUV format has the OSD function provided in the signal processor LSI from which the processed signal is transferred to the display. In other words, the YUV video signal such as the camera signal or broadcast video signal from the imaging device or recording media is transferred to the display device together with the OSD signal of YUV format to which an OSD signal was converted. Therefore, the display device receives the YUV video signal and YUV OSD signal, and converts those signals to the RGB (Red, Green and Blue) video signals for driving the liquid crystal so that they can be displayed on the liquid crystal display panel.

In addition, an example of the display device capable of making OSD is proposed as, for example, in U.S. Pat. No. 6,664,970 (JP-A-2001-42852). In this example, a control unit is used to judge the resolution of the input video signal from the horizontal and vertical synch signals fed together with the input video signal. A resolution converter is provided to convert the resolution of the input video signal on the basis of the resolution found by the control unit to conform to that of the display device. The resolution converter also generates the horizontal and vertical synch signals and pixel clock signal synchronized with this resolution-converted video signal. In addition, an OSD generator is provided to produce an OSD signal in synchronism with those generated horizontal and vertical synch signals and pixel clock signal. Moreover, an OSD mixer mixes this OSD signal and the resolution-converted video signal, and they are displayed in combination on the display panel.

SUMMARY OF THE INVENTION

In the conventional method, since the OSD signal is also converted to a YUV-format digital video signal and again restored to the RGB format for driving the liquid crystal, there is a fear that the OSD signal is displayed differently from the original OSD due to error at each conversion.

If, for example, the digital video signal of YUV format conforms with the Recommendation ITU-R BT. 656-4, it is affected by data-thinning or computation error when it is subjected to the process for interlaced scanning or for YUV 4:2:2 formatting. The result is the occurrence of flickering and color shift. The flickering and color shift remarkably appear particularly in the OSD, and therefore the occurrence of those phenomena create concern with respect to OSD Moreover, in the conventional OSD, an OSD signal is generated in accordance with the resolution of the video signal and the resolution of the display panel so that the layout of OSD, such as the position and size relative to the image, can be achieved as designed.

Therefore, when the layout of OSD is designed in accordance with the resolution of the video signal, the composing of OSD is performed before the stage for converting the video signal to the resolution and color format of the display panel. Thus, in this case, the flickering and color shift similarly occur. In addition, the prior art cannot cope with video signals of various resolutions.

In addition, when the layout of the OSD is designed in accordance with the resolution of the display panel, the composing of OSD is made after the stage for converting the video signal to the resolution and color format of the display panel. This requires a memory for the synchronizing signal that is used to synchronize the converted video signal and the OSD signal, thus leading to high cost. Moreover, it is necessary to change the program to produce the OSD signal for each display panel. Thus, it is difficult to produce various OSD signals.

Accordingly, it is an objective of the invention to provide a display device having an interface to the YUV-format digital video signal, wherein OSD can be made with clear outline and high definition and without color shift and flickering.

In addition, it is another objective of the invention to provide a display device in which an OSD signal is generated without depending on the resolution of the display panel and on the resolution of the video signal so that the cost can be reduced and that the layout of the OSD signal on the screen of the display panel such as relative position and size can be made as designed.

A display device according to the invention receives as a first video signal a YUV video signal of YUV format, such as camera video signal or broadcast video signal from a camera device or recording medium. In addition, an OSD signal as a second video signal is transferred asynchronously with the YUV video signal to the display device through another system different from the YUV video signal, for example, a serial interface, and then the OSD signal is stored in a memory. After the YUV video signal is converted to an RGB video signal in synchronism with a display synch signal, the OSD signal is read from the memory in synchronism with the display synch signal. This read-out OSD signal and RGB video signal are composed, and displayed on the display panel.

In addition, an OSD signal panel-matched conversion circuit is provided to convert the OSD signal of an arbitrary resolution to the same as that of the display panel to prevent change of the relative position and size of the converted OSD signal on the display panel.

Moreover, the memory area in which the OSD signal is temporarily stored in order to be synchronized with the video signal is reduced for low cost by compressing the amount of data of OSD signal. In addition, the OSD signal stored in the memory is read out in synchronism with the display synch signal, and the read OSD signal and the RGB video signal are composed so that the OSD signal can be displayed on the display panel in synchronism with the RGB video signal.

According to this invention, since the display device having an interface to the YUV format digital video signal can make high quality OSD without color shift and flickering, it can be used as a display device necessary for on-screen display such as a monitor for digital camera or television.

In other words, since the OSD signal is converted in accordance with the resolution of the display panel, and displayed on the display panel in synchronism with the display synch signal, any OSD signal having a different resolution can be supplied to the display device asynchronously with the video signal without considering the synchronous timing of the video signal.

In addition, since the resolution of the OSD signal is converted in accordance with the resolution of the display panel, even any OSD signal having a certain resolution can be made to conform to display panels of various resolutions. Therefore, the OSD signal having any resolution can be applied to the display device.

Thus, the OSD signal can be displayed in a suitable position and size relative to the display panel as designed.

Further, since the OSD signal is compressed, the display device having an OSD function incorporated can reduce the cost of the memory.

Other objects, features and advantages of the invention will become apparent from the following description of the embodiments of the invention taken in conjunction with the accompanying drawings.

DETAILED DESCRIPTION OF THE EMBODIMENTS

Embodiment 1

An embodiment 1 of the invention will be described with reference to FIGS. 1 through 6. Although a liquid crystal display device using liquid crystal display elements will be given here and explained as an example of the display device, this invention can be applied to display devices such as organic EL display and FED (Field Emission Display) using electron emitting elements.

Figure 1:
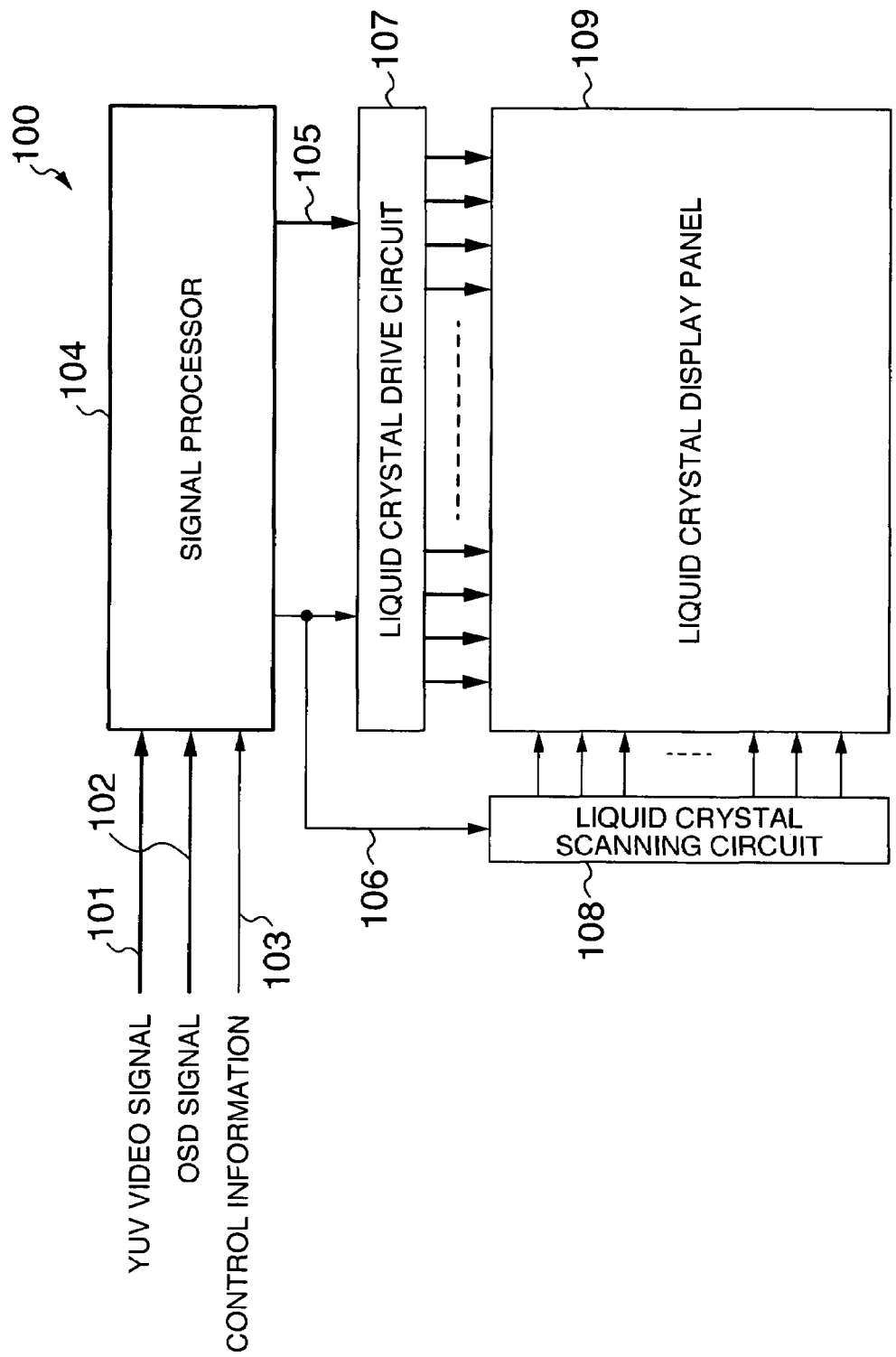
FIG. 1 is a block diagram of a liquid crystal display device according to this invention.

FIG. 1 is a block diagram of a liquid crystal display device 100 in the embodiment 1 of the invention. The liquid crystal display device 100 receives input signals of a YUV video signal 101 of YUV-format, an RGB OSD signal 102 and control information 103. The YUV video signal 101, RGB OSD signal 102 and control information 103 are preferably supplied from separate systems, or through different ports.

The YUV video signal 101 is composed of, for example, luminance information-Y and two kinds U, V of color difference information as specified in Recommendation ITU-R BT. 656-4. This YUV video signal is thus a digital video signal that is sequentially transferred as pixel information.

The OSD signal 102 is display-information for OSD, and is sequentially transferred pixel by pixel as is the video signal, or is compressed image data or positional information and image change data (delta).

The control information 103 is the information to control from the system side the display-related settings such as the output settings for display synch signal and scanning direction. The control information 103 also includes the resolution information of the inputted video signal 101 and OSD signal 102 and the resolution information of a liquid crystal display panel 109.

The input signals of YUV video signal 101, OSD signal 102 and control information 103 are given on an objective basis. For example, the OSD signal and control information may be fed through the same bus, or the video signal may have synch signals embedded. That is, the forms in which the input signals are transmitted are not limited.

The YUV video signal 101, OSD signal 102 and control information 103 are first supplied to a signal processor 104, which then produces a digital RGB composite video signal 105 and display synch signal 106 to drive the liquid crystal display panel 109 that has an array of a plurality of liquid crystal display elements. The RGB composite video signal 105 and display synch signal 106 are supplied to a liquid crystal drive circuit 107, which then produces an analog signal that is to be applied to the liquid crystal display elements of the liquid display panel 109. The display synch signal 106 is also supplied to a liquid crystal scanning circuit 108, which then produces a scanning signal for selecting any ones of the liquid crystal display elements of liquid crystal display panel 109. The liquid crystal display elements selected by the scanning signal produced from the liquid crystal scanning circuit 108 are driven by the analog signal produced from the liquid crystal drive circuit 107, so that a picture is displayed on the liquid crystal display panel 109.

The signal processor 104 will be described in detail with reference to FIGS. 2 and 3. For the sake of simple explanation, it is assumed that the YUV video signal 101 is the video signal according to the Recommendation ITU-R BT. 656-4 (resolution: 640×1(Y) 33240, 320×2(UV)×240), the OSD signal 102 is the VGA interlaced signal (resolution: 640×3 (RGB)×240) transmitted at each update, and the liquid crystal display panel 109 has a resolution of 960×240.

Figure 2:
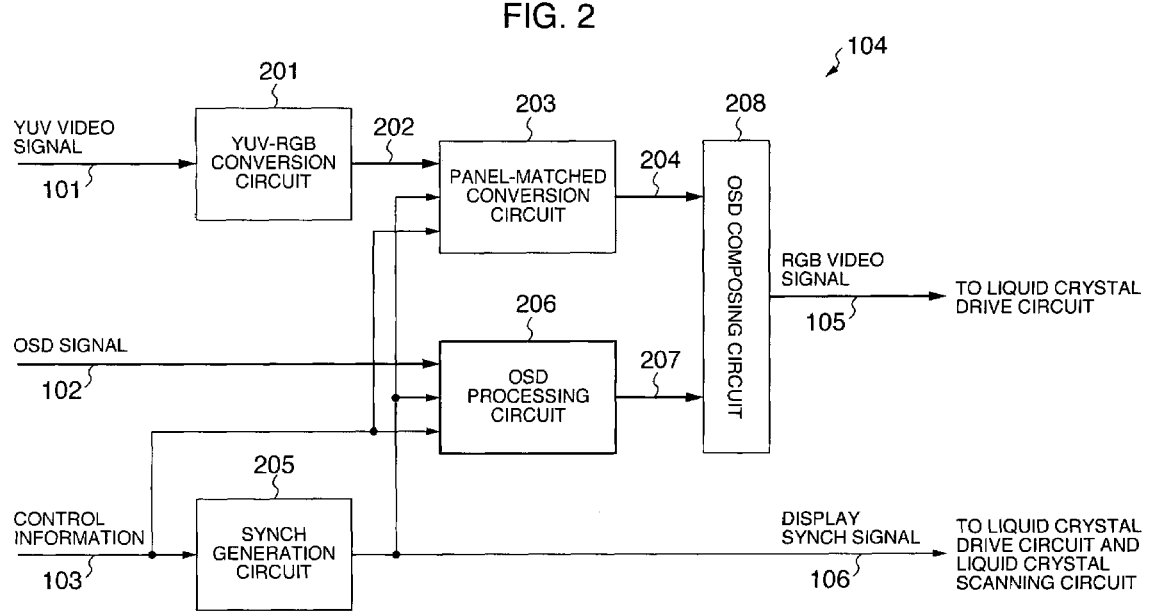
FIG. 2 is a block diagram of the signal processor 104 shown in FIG. 1.

FIG. 2 is a block diagram showing a specific construction of the signal processor 104 shown in FIG. 1. FIG. 3 is a timing chart useful for explaining the operation of this signal processor 104. The signal processor 104 has a YUV-RGB conversion circuit 201, a synch generation circuit 205, a panel-matched conversion circuit 203, an OSD processing circuit 206 and an OSD composing circuit 208.

Figure 3:
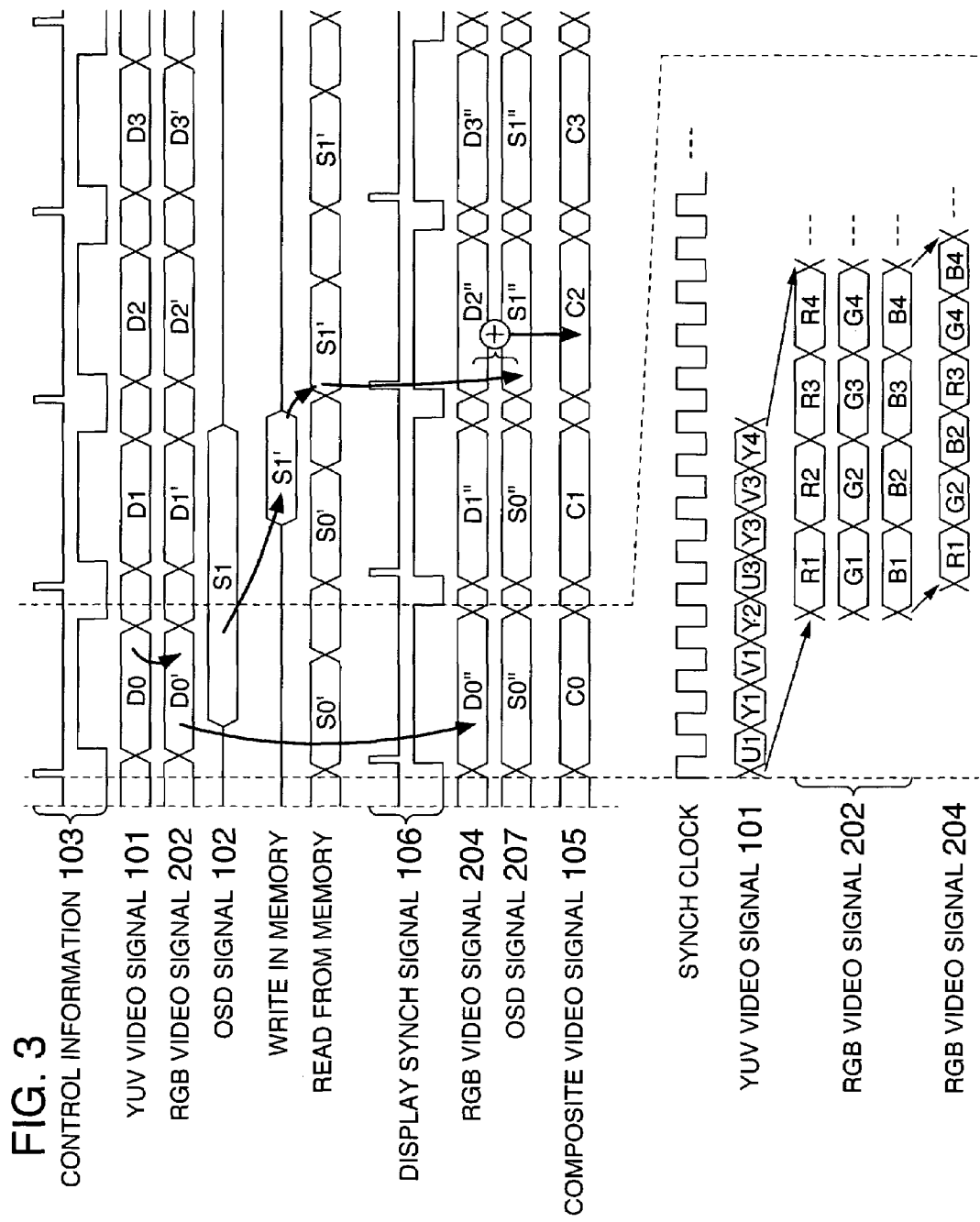
FIG. 3 is a timing chart for the signal processor 104.

First, the YUV-RGB conversion circuit 201 processes the YUV 4:2:2-format YUV video signal 101 by computation in synchronism with a synch clock as shown in FIG. 3 on the lower-area side, thus converting it to an RGB video signal 202 of RGB 4:4:4 format for each pixel.

When receiving the control information 103, the synch generation circuit 205 responds to the synch signal and retrace line period information of liquid crystal panel 109 included in the control information 103 to produce the display synch signal 106 for an effective signal and line start signal of video data to be displayed on the liquid crystal panel 109.

Then, the panel-matched conversion circuit 203 receives the RGB video signal 202, display synch signal 106, and control information 103. This control information has the ratio between the resolutions of the inputted YUV video signal and liquid crystal display panel 109 (hereinafter, referred to as "resolution conversion rate"), or it has a resolution conversion rate of ½ in this case. Thus, the conversion circuit 203 converts the resolution of the input video signal 202 in synchronism with the display synch signal 106 from the resolution of 640×3 (RGB) to the equivalent of 960-pixel data of RGB delta arrangement, or ½ the resolution 640×3(RGB) =1920, or 960 pixels as a panel-matched RGB video signal 204. This resolution conversion may be made by using any system such as the system in which the thinning is made by removing one from every two pieces of image data or the system in which an average value is determined from every two pieces of image data by liner computation and employed.

In addition, when the image data is converted to data of delta arrangement and displayed on the liquid crystal display panel 109 of delta arrangement, the outline of the image looks different from the original color because the RGB colors are unbalanced by the thinning of image data. In order to avoid this, a low-pass filtering process may be used. The coefficient of this low-pass filter is set by using control information 103.

The OSD processing circuit 206 receives the OSD signal 102, the display synch signal 106 and the control information 103 of a resolution conversion rate or the like. Then, it compresses the OSD signal 102 transferred at every update and makes the compressed OSD signal be stored in a memory as indicated by the arrow of S1 to S1' in FIG. 3. When this signal is read out from the memory, the OSD processing circuit 206 produces a panel-matched RGB OSD signal 207 that corresponds to the data of 960 pixels in synchronism with the display synch signal 106.

Figure 4:
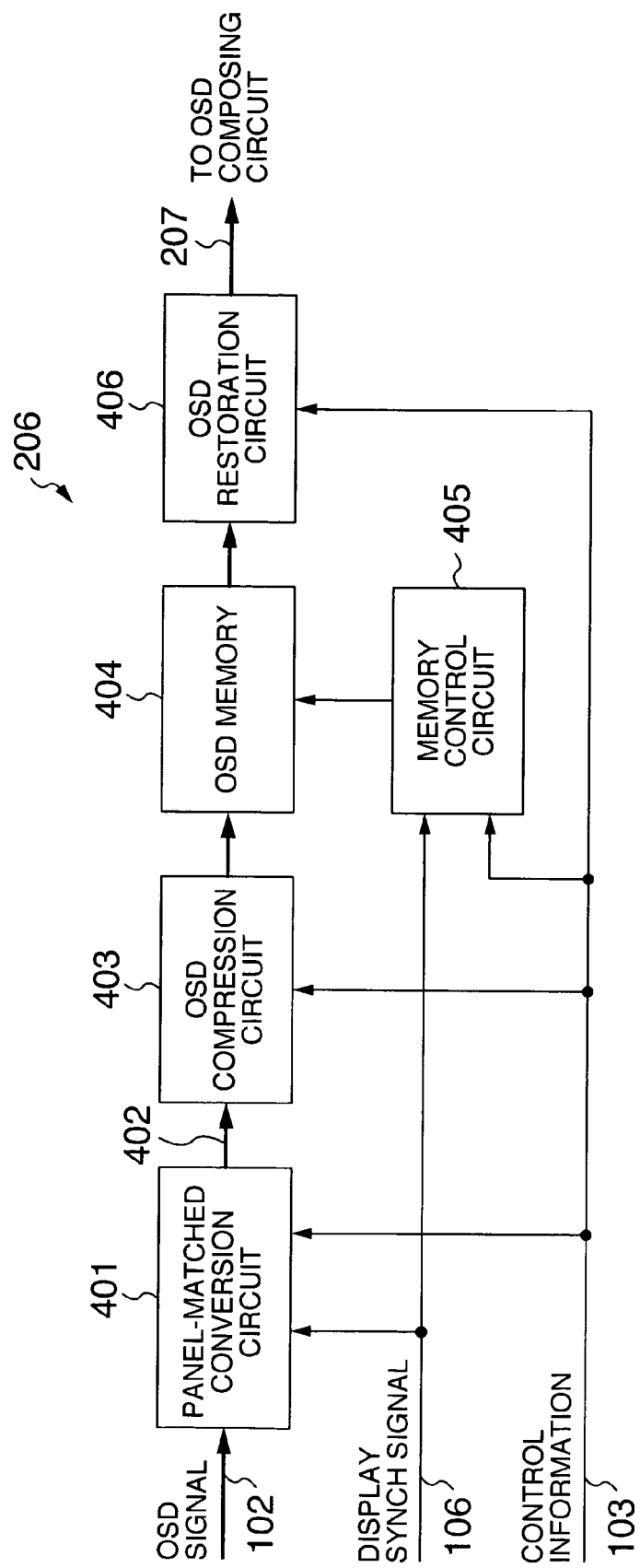
FIG. 4 is a block diagram of the OSD processing circuit 206 shown in FIG. 3.

Here, the OSD processing circuit 206 will be described in detail with reference to FIG. 4. FIG. 4 is a block diagram showing a specific construction of the OSD processing circuit 206.

This OSD processing circuit 206 has an OSD panel-matched conversion circuit 401, an OSD compression circuit 403, an OSD memory 404, a memory control circuit 405 and an OSD restoration circuit 406.

First, the OSD panel-matched conversion circuit 401 receives the OSD signal 102, the display synch signal 106 and the control information 103 of a resolution conversion rate. Then, it converts the resolution of OSD signal 102 to produce an OSD signal 402 adapted to the liquid crystal display panel 109 to be used. In other words, the resolution, 640×3(RGB)× 240=1920×240, of the OSD signal 102 is converted to ½ as much in order to conform with the resolution, 960×240 of delta arrangement, of liquid crystal display panel 109.

Thus, since the OSD panel-matched conversion circuit 401 is provided to receive OSD signal 102, even the OSD signal unsuitable for the resolution of liquid crystal display panel 109 can be processed to be suitable as is the panel-matched conversion circuit 203 to the RGB video signal 202. In addition, even the same OSD signal 102 can be suitably used without using another type of OSD signal by processing it to conform with a different resolution of any liquid crystal display panel.

Here, if the display device employs the liquid crystal display panel of another resolution, or 640×240 of delta arrangement, the same resolution, 640×3(RGB)×240, of the OSD signal 102 is converted to ⅓ as much by the OSD panel-matched conversion circuit 401 in order to match the equivalent of 640 pixels of delta arrangement. In this case, the OSD signal 102 is not replaced by another type of OSD signal, but only the resolution conversion rate of control information 103 can be changed to cope with that situation. Thus, as mentioned above, the same OSD signal 102 can be supplied to the display device to display on the liquid crystal display panel having a resolution different from that of the OSD signal.

In addition, even if address data for specifying the displaying position of OSD signal 102 and compressed data of OSD signal 102 are directly transferred to the conversion circuit 401 as the OSD signal 102, the conversion circuit 401 makes the resolution conversion process by computing the post-conversion address data and compressed data from the inputted address data and compressed data.

If the OSD signal 102 to the conversion circuit has information formed of address data for specifying a displaying position on an assumed frame of 1920×240 in order for a rectangular window of 300 horizontal pixels×40 vertical pixels to be displayed located from a point of horizontal position 240 and vertical position 100, the OSD panel-matched conversion circuit 401 converts it to address data that assumes the resolution, 960×240 of delta arrangement, of liquid crystal display panel 109. In other words, it computes the conversion of the input address data to ½ as much in the horizontal direction and 1 as much in the vertical direction, thus converting to a rectangular area of 150 horizontal pixels×40 vertical pixels to be displayed located from a point of horizontal position 120 and vertical position 100.

Thus, since the OSD signal 102 can be converted to the resolution of liquid crystal display panel 109 even when the display device transfers the address data for specifying the displaying position of OSD signal 102 and the compressed data of OSD signal 102 to the display panel, the video signal and OSD signal are not shifted in their positions and sizes when they are composed, that is, the OSD can be suitably performed with no such problems.

When the liquid crystal display panel 109 is to display only a small amount of information as compared with the OSD signal 102, or when resolution-reducing conversion is necessary, the OSD panel-matched conversion circuit 401 first converts the resolution of the OSD signal to a low resolution. In this case, if the OSD signal is compressed after the conversion, excess information need not be stored in the OSD memory 404, and thus the memory capacity can be reduced advantageously.

The OSD compression circuit 403 compresses the amount of data of the resolution-reduced signal, or OSD signal 402 according to the control information 103 that specifies how to compress. Thus, the memory area can be reduced since the amount of data is decreased, leading to low memory cost.

Figure 5:
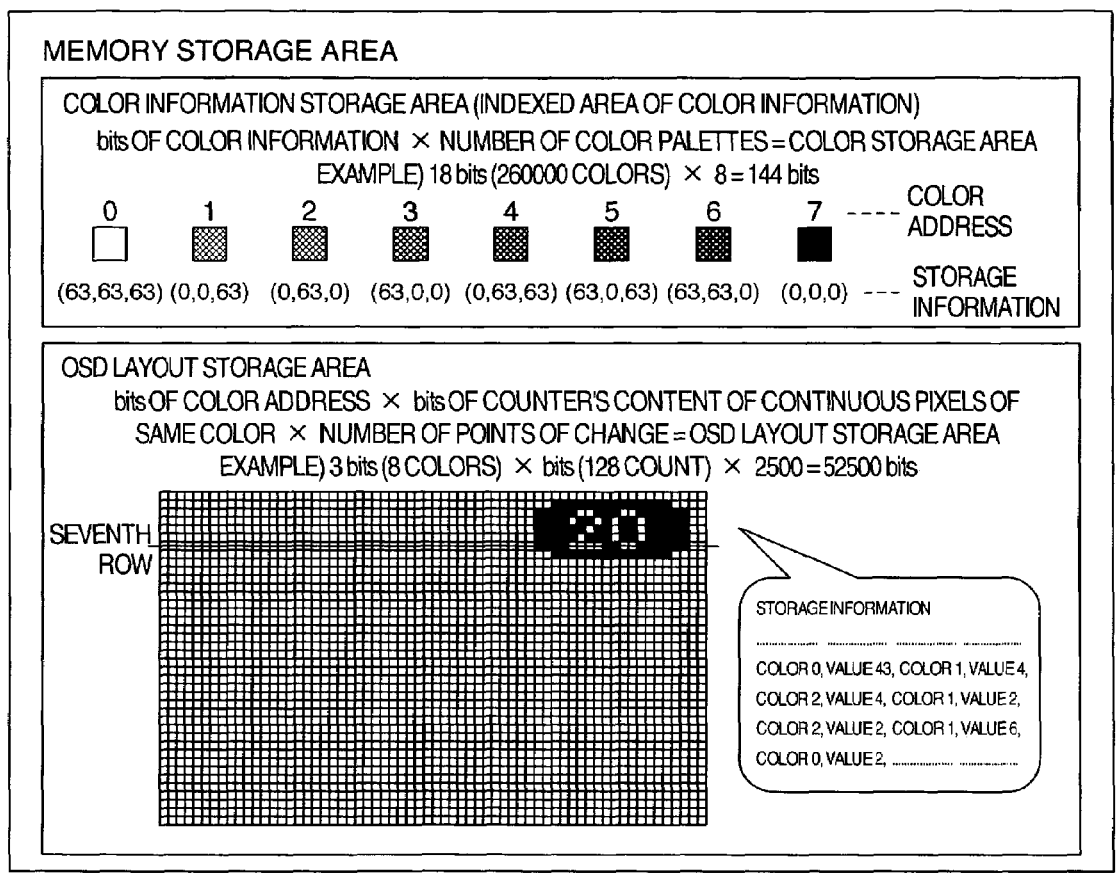
FIG. 5 is a diagram to which reference is made in explaining the compression system 1 for the OSD signal.

An example of the compression of the amount of data (hereinafter, referred as "compression system 1") will be described with reference to FIG. 5. In this compression system 1, when pixel information as the OSD signal is sequentially transferred as is the video signal, the color information is indexed and allotted to the addresses (hereinafter, referred to as "color addresses") within the storage area for color information (hereinafter, referred to as "color information storage area") in the storage area of the memory (hereinafter, referred to as "memory storage area").

When OSD is performed, color information is often used to make the characters and windows easy to see, and thus does not need many kinds of color in most cases.

Therefore, if the color information that can be displayed is 6 bits for each color of RGB, about 260000 colors can be utilized. Of these colors, eight colors are selected, and color information to be used is previously assigned to the color addresses of the color information storage area. For example, white (63, 63, 63) is allotted to color address 0, blue (0, 0, 63) to color address 1, green (0, 63, 0) to color address 2, ..., black (0, 0, 0) to color address 7. The OSD using any one of the eight colors is performed by referring to the assigned color addresses.

In addition, the color information to be used can be arbitrarily assigned in advance by increasing or decreasing the number of color addresses, or by using, for example, five colors or sixteen colors other than eight colors. Moreover, information of the degree of transparency such as 50-% transparency can be assigned as an index to a color address.

Therefore, the storage capacity necessary for the color information storage area is the bit number of color information multiplied by the number of color palettes. If we take color information of 18 bits (about 260000 colors) and eight color palettes, color information can be indexed by preparing the color information storage area of 18×8=144 bits.

The number of pixels as to the indexed color is counted until the change of color while the sequential transfer of pixel information is being observed, and the indexed color is sequentially converted to values of a color address and the number of pixels over which the corresponding color continues. Those values are sequentially stored in the region for storing the layout of OSD signal (hereinafter, referred to as "OSD signal layout storage area"), so that the OSD signal can be stored with the amount of data cut down.

The above operation will be described with reference to the seventh line of the OSD layout storage area shown in FIG. 5. In the OSD layout storage area are sequentially stored values of 0 (color address), 43 (count), 1 (color address), 4 (count), 2 (color address), 4 (count), 1 (color address), 2 (count), 2 (color address), 2 (count), 1 (color address), 6 (count), 0 (color address), 2 (count), ....

Here, the bit number of color address and bit number of count are previously set, and the breakpoints of sequence of numbers and the content of the value are already determined. Although the amount of data changes depending on the displayed pattern, the maximum number of points of change (hereinafter, referred to as "maximum change number") is limited so that the memory capacity of OSD memory 404 can be reduced.

The system side (OSD designer) is informed of the limit of this maximum change point and requested to design the OSD within the limit. The memory capacity of the OSD layout storage area is computed from the expression of (bit number of color address)×(bit number of pixel counter)×(maximum change number). If we take eight color palettes (3 bits), 128-counter (7-bit counter) and 2500 points (an average of about 10 per line) as maximum change point, the OSD signal can be stored in the OSD layout storage area of 3×7×250=52500 bits.

Therefore, the memory storage area necessary for storing one frame of 960×240 of delta arrangement and eight color data (3 bits) is computed as (960÷3)×240×3=230400 bits. On the other hand, according to the compression system 1 of this embodiment 1, the color information storage area and OSD layout storage area are respectively 144 bits and 52500 bits, and thus the memory storage area is computed as 144+52500=52644 bits. Thus, one frame can be stored in the area of about ¼ that amount.

Figure 6:
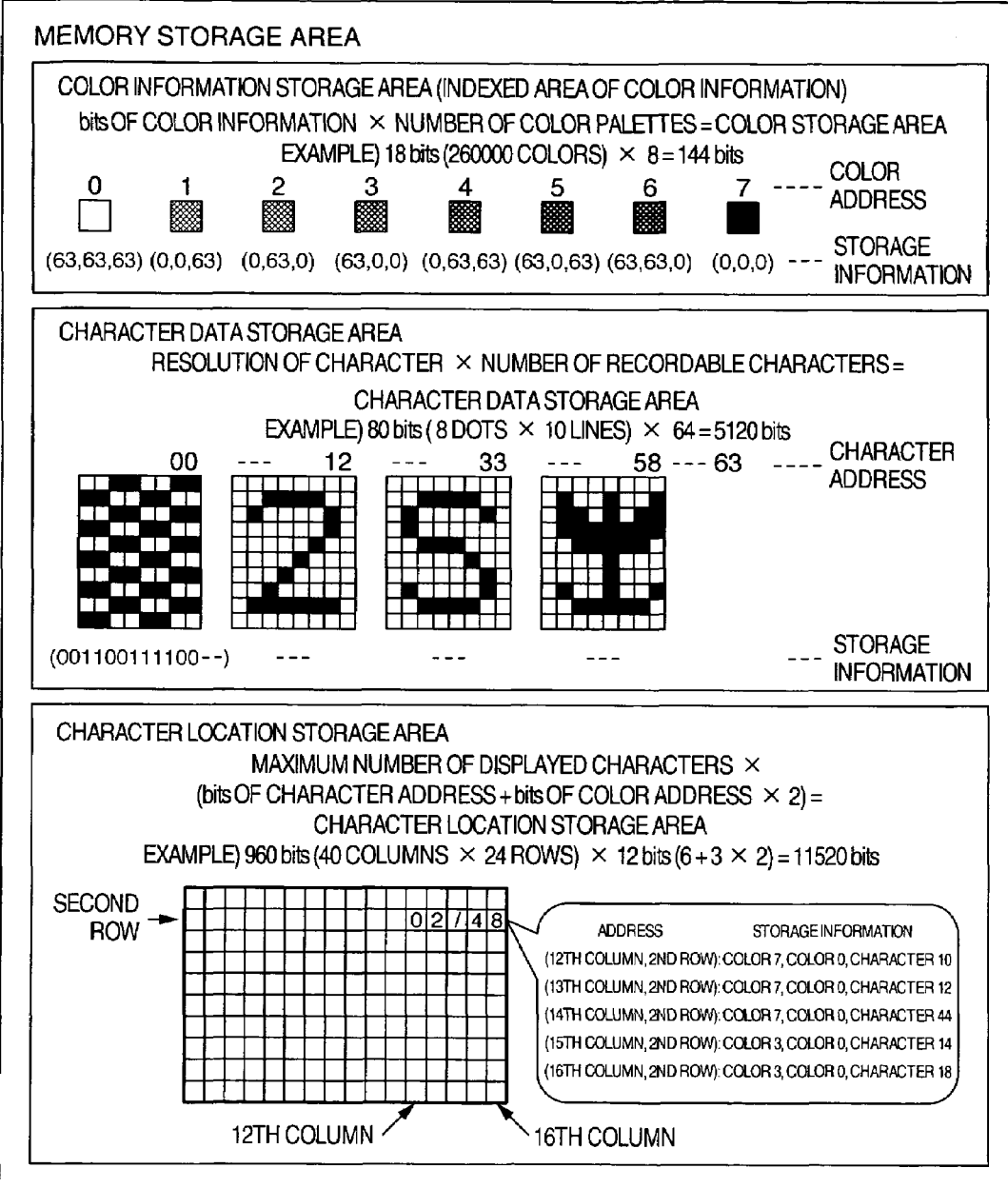
FIG. 6 is a diagram useful for explaining the compression system 2 for the OSD signal.

In addition, with reference to FIG. 6, description will be made of an example of compressing the amount of data (hereinafter, referred to as "compression system 2") that is different from the compressing system 1. As we previously described about the compression system 1, the OSD signal is often used to make the characters and windows easy to see, and thus does not need many kinds of color in most cases. Moreover, it is often used to display fixed patterns such as characters and symbols.

In the compression system 2, when the OSD signal is transferred as, for example, pixel address, color information and shape in a form of commands, the color information can be indexed and assigned to color addresses within the 144-bit color information storage area of the memory storage area as is the compression system 1.

In addition, only the characters and patterns to be used to display are allotted as character data of a previously fixed resolution to the addresses (hereinafter, referred to as "character addresses") within the storage area for the character data (hereinafter, referred to as "character data storage area") of the memory storage area, and stored in that area.

The assigning of character data to be used to the character data storage area is performed, for example, as a checkered pattern is assigned to character address 00, a numerical character "2" to character address 12, an alphabetical character "S" to character address 33, and so on.

The storage capacity necessary for this character data storage area is the resolution of one character multiplied by the number of characters to be stored. If the resolution and character number are respectively 8(dots)×10(lines)=80 bits, and 64-pattern characters, then the character data storage area is computed as 80×64=5120 bits. Thus, the character data can be indexed and assigned thereto.

The memory storage area has a region provided for storing the location of characters (hereinafter, referred to as "character location storage area") so that the color address (character color and background color) associated with character address is stored in the addresses (hereinafter, referred to as "location address") of the character location storage area. Thus, complicated characters can be stored in a small-capacity memory area.

Description will be made of, for example, the 12th to 16th columns of the second row of the character location storage area shown in FIG. 6. An address is fixed at each location of the character location storage area, and values are stored as follows. For example, 7 (character color: black), 0 (background color: white) and 10 (character: 0) are stored in the address of the location specified by the 12th column and second row, 7 (character color: black), 0 (background color: white) and 12 (character: 2) in the address of the location specified by the 13th column and second row address, 7 (character color: black), 0 (background: white) and 44 (character: /) in the address of the location specified by the 14th column and second row address, 3 (character color: green), 0 (background color: white) and 14 (character: 4) in the address of the location specified by the 15th column and second row address, 3 (character color: green), 0 (background color: white) and 18 (character: 8) in the address of the location specified by the 16th column and second row address, and so on.

The storage capacity necessary for this character location storage area is (the maximum number of characters to be displayed) multiplied by ((the bit number of character address)+(the bit number of color address)×2(character color and background color)). If characters of 40 columns×24 rows (960 bits) can be located, and if 64 characters (6 bits) and eight color palettes (3 bits) are selected, the OSD signal can be stored in the character location storage area of 960×(6+3×2) =11520 bits.

Therefore, when the OSD signal has 8 colors and QVGA, the memory area necessary for storing one frame according to the above description was 230400 bits, but the memory area according to the compression system 2 of this embodiment is as follows. Since the color information storage area, character data storage area and character location storage area are 144 bits, 5120 bits and 11520 bits, respectively, the necessary region for storing one frame can be computed as 144+5120+ 11520=16784 bits, or less than 1/10 the above-mentioned capacity.

In addition, if the color address and character address are changed with the character location address fixed as the OSD signal, data with a small partial change of OSD signal can be transferred, and thus fast OSD is performed.

The OSD memory 404 temporarily stores the compressed OSD signal, and reads it out in synchronism with a read timing signal generated from the display synch signal 106. Thus, the OSD signal can be synchronized with the displaying timing.

The memory control circuit 405 is responsive to the display synch signal 106 and to the control information 103 for specifying a compression/restoration method to generate a timing signal by which the compressed OSD signal is controlled to write in and read from the OSD memory 404.

Then, the OSD restoration circuit 406 responds to the control information 103 that indicates the information of the compression system of the OSD compression circuit 403 to produce a panel-matched RGB OSD signal 207 in accordance with the restoration system associated with the compression system. This panel-matched RGB OSD signal 207 is sequentially produced and transferred pixel by pixel as a RGB signal in synchronism with the display synch signal 106.

When the restoration system is associated with the compression system 1, the color address and the number of pixels over which the corresponding color continues are read out from the memory, and processed to produce the RGB signal as the panel-matched RGB OSD signal 207 that is sequentially transferred pixel by pixel.

When the restoration system is associated with the compression system 2, the panel-matched RGB.OSD signal 207 is sequentially produced and transferred pixel by pixel as an RGB signal by reading the two color addresses and character address of character color and background color that were sequentially stored in the character location storage area of the memory and by referring to the two pieces of color information and character data associated with the character color and background color according to the read addresses.

Then, the OSD composing circuit 208 shown in FIG. 2 composes the panel-matched RGB video signal 204 and panel-matched RGB OSD signal 207 that correspond to 960-pixel data and that are synchronized with the displaying timing, and generates the RGB composite video signal 105 having the resolution of delta arrangement, 960×240, that is suited to display on the liquid crystal display panel 109 as indicated in FIG. 3 at D2"+S1".

The method for composing video signals includes the overlay system for displaying the OSD signal preferentially, and the α-composing system in which the transparency is fixed by giving a coefficient α, thus allowing the OSD signal to be displayed in such a form that the OSD image can be seen through the video image by the computation of the video signal and OSD signal.

The liquid crystal driving circuit 107 and liquid crystal scanning circuit 108 drive the liquid crystal display panel 109 to display images according to the generated RGB composite video signal 105 that contains the OSD corresponding to 960-pixel data, and to the display synch signal 106.

Sine this embodiment provides the OSD composing circuit 208 after the YUV-RGB converter circuit 201 to which the YUV video signal is applied and after the panel-matched conversion circuit 203 to which the RGB video signal is applied, the OSD signal is never interlaced and converted in color according to the YUV video signal. Therefore, the OSD can be performed without causing the flickering due to the interlacing and the color shift due to the color conversion.

In addition, since the panel-matched conversion circuit 401 is provided to process the OSD signal, the OSD signal can be applied to various display panels without depending on the liquid crystal display panel 109. Moreover, since the OSD compression circuit 403 and OSD restoration circuit 406 are provided, the display device for asynchronous OSD signal can be achieved with the memory capacity reduced.

Embodiment 2

Figure 7:
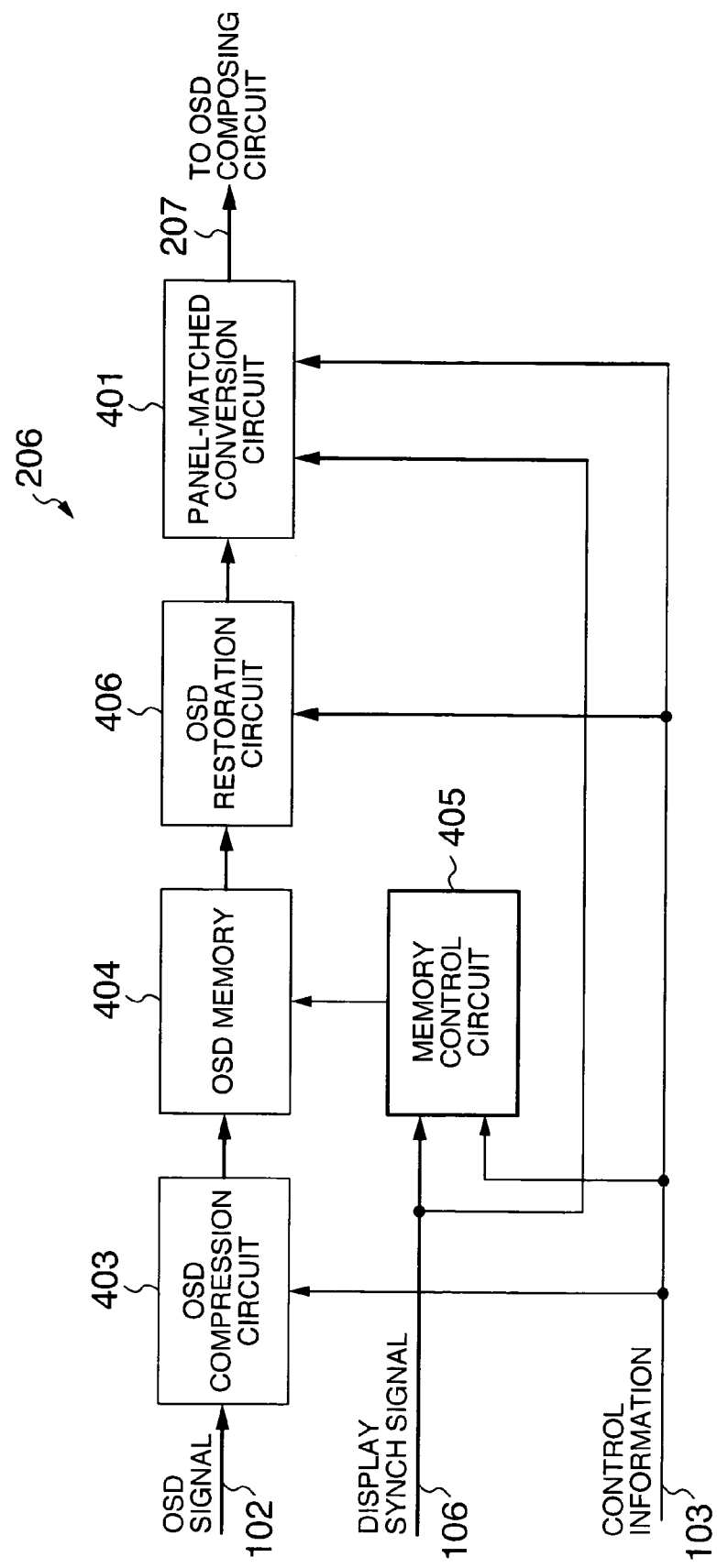
FIG. 7 is a block diagram showing another construction of the OSD processing circuit 206 shown in FIG. 3.

The embodiment 2 of this invention utilizes another construction of the OSD processing circuit 206 mentioned with reference to FIG. 4 for embodiment 1. This construction will be described below with reference to FIG. 7.

The OSD processing circuit 206 of this embodiment has the same elements as those of embodiment 1 (the panel-matched conversion circuit 401 for OSD, the OSD compression circuit 403, the OSD memory 404, the memory control circuit 405 and the OSD restoration circuit 406), but it is different in the order of processing. In the embodiment 1, the inputted OSD signal 102 was processed to convert by the OSD panel-matched conversion circuit 401 and then to undergo the compression/restoration using the memory (the OSD compression circuit 403, the OSD memory 404, the memory control circuit 405 and the OSD restoration circuit 406). In this embodiment, the OSD signal 102 undergoes the compression/restoration process using the memory, and then the conversion process using the OSD panel-matched conversion circuit 401.

The following description is about the case in which the OSD signal 102 and the liquid crystal display panel 109 are respectively a signal of QVGA (320×RGB×240) transmitted for each update and a resolution (640×RGB×240) corresponding to the interlace of VGA, and in which the control information includes information for discriminating the resolutions of the OSD signal 102 and liquid crystal display panel 109 and for ordering the signal to be magnified by conversion.

In this case, since the amount of data of one frame of OSD signal 102 is smaller than that necessary to display on the liquid crystal display panel 109, the control information 103 containing the information for magnifying by conversion is necessary to order the OSD signal to be magnified by conversion. Therefore, the OSD signal 102 should be compressed before the magnifying conversion, and stored in the OSD memory 404 because this is advantageous in that the memory capacity can be reduced.

In this embodiment, too, since the amount of data of one frame of OSD signal 102 is larger than that necessary to display on the liquid crystal display panel 109, the control information 103 containing the information for reducing by conversion is used to order the OSD panel-matched conversion circuit 401 to convert for reduction, thus bringing the advantage for reducing the memory capacity.

In addition, similarly as to the compression process, since the process in which the inputted OSD signal of resolution 320×RGB×240 is compressed before the resolution conversion handles a smaller amount of data than the process in which it is compressed after the magnifying conversion to a resolution corresponding to the resolution of 640×RGB×240 of liquid crystal display panel 109, it is preferable to compress the OSD signal 102 and then store it in the OSD memory 404 before the conversion in that excess information can be avoided from being stored in the OSD memory 404.

In this embodiment, too, since the OSD panel-matched conversion circuit 401 is provided, the OSD signal 102 can be applied even when it does not match with the specification of liquid crystal display panel 109. That is, even a liquid crystal display panel with a different specification can be used to accept the same OSD signal 102, or various display panels can be applied to the display device of this embodiment. Moreover, even if the amount of information to be displayed on the display panel is larger than that of the OSD signal, the same effect as in embodiment can be achieved.

The resolutions of the inputted video signal 101 and OSD signal 102 and that of the liquid crystal display panel 109 mentioned in the sections of embodiments 1 and 2 are specified for the convenience of explanation, and thus those signals and the display panel are not limited to those resolutions. In addition, the pixel arrangement of liquid crystal display panel 109 is not limited to the RGB stripe type arrangement and delta type arrangement.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A display device comprising:
a display panel having an array of display elements;
a signal processor that responds to control information and to a display synchronization signal generated from said control information to produce a panel-matched video signal and panel-matched on-screen display (OSD) signal of which the resolutions correspond to that resolution of said display panel, and that produces at an output of the signal processor a composite video signal of said panel-matched video signal and said panel-matched OSD-signal together with said display synchronization signal;
a scanning circuit that produces an output of a scanning signal in synchronism with said display synchronization signal produced from said signal processor so as to select ones of said arrayed display elements of said display panel; and
a drive circuit that uses said composite video signal and said display synchronization signal produced from said signal processor to drive said display elements selected by said scanning signal produced from said scanning circuit, said signal processor comprising:
a conversion circuit which converts the format of an inputted video signal;
a panel-matched conversion circuit which converts a video signal produced from said conversion circuit to said panel-matched video signal;
an OSD processing circuit which converts an inputted OSD signal to said panel-matched OSD signal;
a synchronization signal generation circuit which supplies said control information and said display synchronization signal to said panel-matched conversion circuit and said OSD processing circuit; and
an OSD composing circuit which composes said panel-matched video signal and said panel-matched OSD signal.

2. A display device according to claim 1, wherein said OSD processing circuit comprises:
a compression circuit which compresses said panel-matched OSD signal or said OSD signal;
a memory which stores said compressed panel-matched OSD signal or said compressed OSD signal;
a restoration circuit which restores said compressed panel-matched OSD signal or said compressed OSD signal read from said memory to the original signals; and
an OSD panel-matched conversion circuit which converts the resolution of said OSD signal or said restored OSD signal to a resolution corresponding to the resolution of said display panel, and
the OSD signal which is inputted asynchronously with said inputted video signal is synchronized with said display synchronization signal.

3. A display device according to claim 2, wherein when said control information indicates that the amount of one-frame data of said OSD signal is larger than that necessary to display on said display panel, said OSD panel-matched conversion circuit converts the resolution of said OSD signal to a resolution corresponding to the resolution of said display panel before said OSD signal is stored in said memory.

4. A display device according to claim 2, wherein when said control information indicates that the amount of one-frame data of said OSD signal is smaller than that necessary to display on said display panel, said OSD panel-matched conversion circuit converts the resolution of said OSD signal to a resolution corresponding to the resolution of said display panel after said OSD signal is read from said memory.

5. A display device according to claim 2, wherein when said control information contains a value for specifying a displaying position, said OSD panel-matched conversion circuit converts said value for specifying said displaying position to a value for specifying a displaying position on said display panel.

6. A display device according to claim 1, wherein said OSD signal is supplied asynchronously with said inputted video signal when the OSD signal is inputted to said display device, and then said OSD signal is displayed in synchronism with said video signal when the OSD signal is supplied to said display panel.

7. A display device according to claim 1, wherein the format of said inputted OSD signal is different from the format of said inputted video signal, but the format of said OSD signal to be displayed on said display panel is the same as the format of said video signal to be displayed on said display panel.

8. A display device according to claim 7, wherein
the format of said inputted video signal is a YUV format,
the format of said inputted OSD signal is an RGB format, and
the format of said OSD signal to be displayed on said display panel and the format of said video signal to be displayed on said display panel are both RGB format.

9. A display device according to claim 1, wherein said signal processor comprises:
a first input port for receiving said inputted video signal; and
a second input port for receiving said inputted OSD signal.

10. A display device for composing a first video signal and a second video signal and displaying the resulting composite video signal, comprising:
- a display panel;
- a signal processor which processes said first and second video signals; and
- a drive circuit which drives said display panel to display said processed first and second video signals, wherein
- the format of said first video signal fed to said display device is different from that of said second video signal fed to said display device,
- said second video signal is supplied to said display device asynchronously with said first video signal,
- said second video signal is displayed on said display panel in synchronism with said first video signal, and
- said signal processor converts the format of said second video signal to the same format as that of said first video signal, makes said first video signal be synchronized with said second video signal, and composes said synchronized first video signal and said converted second video signal.

11. A method comprising steps of:
- converting a video signal and an OSD signal to a panel-matched video signal and a panel- matched OSD signal on the basis of control information, respectively,
- composing said panel-matched video signal and said panel-matched OSD signal to produce a composite video signal, and
- causing a display panel to display said composite video signal in synchronism with a display synchronization signal derived from said control information, wherein:
- the converting of said video signal into said panel-matched video signal is based on said display synchronization signal, and
- the converting of said OSD signal into said panel-matched OSD signal is based on said display synchronization signal.

12. A method according to claim 11, further comprising:
- converting the format of said video signal, wherein the converted video signal is converted to said panel-matched video signal on the basis of said control information after the conversion of the format of said video signal.

13. A method according to claim 11, further comprising compressing said OSD signal or said panel-matched OSD signal.

* * * * *